United States Patent
Yamaguchi

(10) Patent No.: US 9,383,868 B2
(45) Date of Patent: Jul. 5, 2016

(54) INPUT DEVICE, INPUT CONTROL METHOD, PROGRAM AND ELECTRONIC APPARATUS

(75) Inventor: Yoshiyuki Yamaguchi, Kawasaki (JP)

(73) Assignee: NEC CORPORATION, Tokyo (JP)

( * ) Notice: Subject to any disclaimer, the term of this patent is extended or adjusted under 35 U.S.C. 154(b) by 194 days.

(21) Appl. No.: 13/976,760

(22) PCT Filed: Dec. 13, 2011

(86) PCT No.: PCT/JP2011/006942
§ 371 (c)(1),
(2), (4) Date: Jul. 2, 2013

(87) PCT Pub. No.: WO2012/090405
PCT Pub. Date: Jul. 5, 2012

(65) Prior Publication Data
US 2013/0278560 A1    Oct. 24, 2013

(30) Foreign Application Priority Data

Dec. 28, 2010  (JP) .................................. 2010-293161

(51) Int. Cl.
*G06F 3/044* (2006.01)
*G06F 3/041* (2006.01)

(52) U.S. Cl.
CPC .............. *G06F 3/044* (2013.01); *G06F 3/0416* (2013.01); *G06F 2203/04108* (2013.01)

(58) Field of Classification Search
CPC .................................................. G06F 3/0412
See application file for complete search history.

(56) References Cited

U.S. PATENT DOCUMENTS

| | | |
|---|---|---|
| 7,679,376 B2 | 3/2010 | Kang et al. |
| 8,217,914 B2 | 7/2012 | Koshiyama et al. |
| 8,284,165 B2 | 10/2012 | Koshiyama et al. |
| 8,665,237 B2 | 3/2014 | Koshiyama et al. |
| 2008/0012835 A1 | 1/2008 | Rimon et al. |
| 2008/0122798 A1 | 5/2008 | Koshiyama |
| 2008/0174321 A1 | 7/2008 | Kang |

(Continued)

FOREIGN PATENT DOCUMENTS

| | | |
|---|---|---|
| JP | 2003-330618 | 11/2003 |
| JP | 2008-117371 | 5/2008 |
| JP | 2008-134836 | 6/2008 |
| JP | 2009-543246 | 12/2009 |
| WO | 2008/007372 | 1/2008 |
| WO | 2009-107415 | 9/2009 |

OTHER PUBLICATIONS

International Search Report PCT/JP2011/006942 dated Mar. 19, 2012, with English translation.

(Continued)

*Primary Examiner* — Amare Mengistu
*Assistant Examiner* — Shawna Stepp Jones
(74) *Attorney, Agent, or Firm* — Young & Thompson

(57) ABSTRACT

An object of the present invention is to provide an input device that can achieve a hover operation and a touch operation that are differentiated and detected without inviting degradation in detection responsiveness to the touch operation. The input device includes a selecting section for selecting a pair from among a plurality of X electrodes and Y electrodes disposed as being spaced apart from each other, a detecting section for detecting a touch operation or a hover operation from a change of an electric characteristic of the pair, and a setting section for setting part of at least either of the X electrodes and the Y electrodes as hover electrodes for hover operation detection and setting at least part of the other electrodes as touch electrodes for touch operation detection.

8 Claims, 13 Drawing Sheets

(56) References Cited

U.S. PATENT DOCUMENTS

| | | |
|---|---|---|
| 2008/0297487 A1 | 12/2008 | Hotelling et al. |
| 2011/0007021 A1* | 1/2011 | Bernstein .............. G06F 3/0416 345/174 |
| 2011/0043478 A1 | 2/2011 | Matsushima |
| 2011/0279364 A1 | 11/2011 | Koshiyama et al. |
| 2011/0291973 A1* | 12/2011 | Ito et al. ........................ 345/173 |
| 2012/0044199 A1* | 2/2012 | Karpin et al. ................. 345/174 |
| 2012/0242608 A1 | 9/2012 | Koshiyama et al. |
| 2014/0152605 A1 | 6/2014 | Koshiyama et al. |

OTHER PUBLICATIONS

Chinese Office Action, dated Jun. 3, 2015; Application No. 201180063322.5.

JP Office Action, dated Aug. 24, 2015; Application No. 2012-550695.

* cited by examiner

FIG. 5
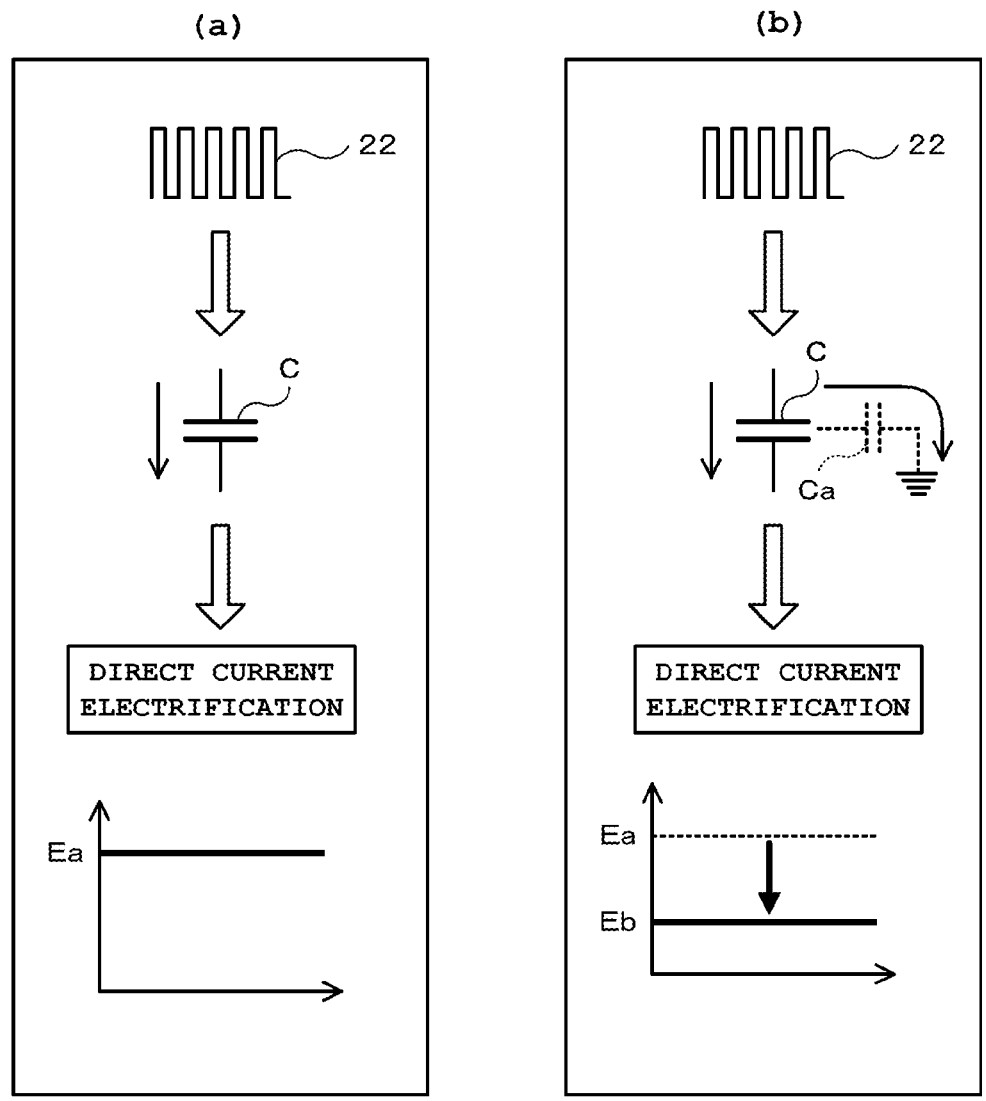
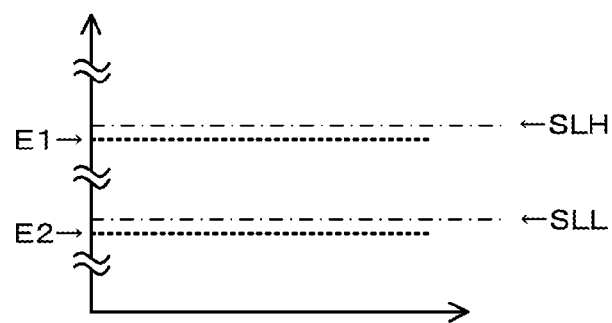

FIG. 12
(a)
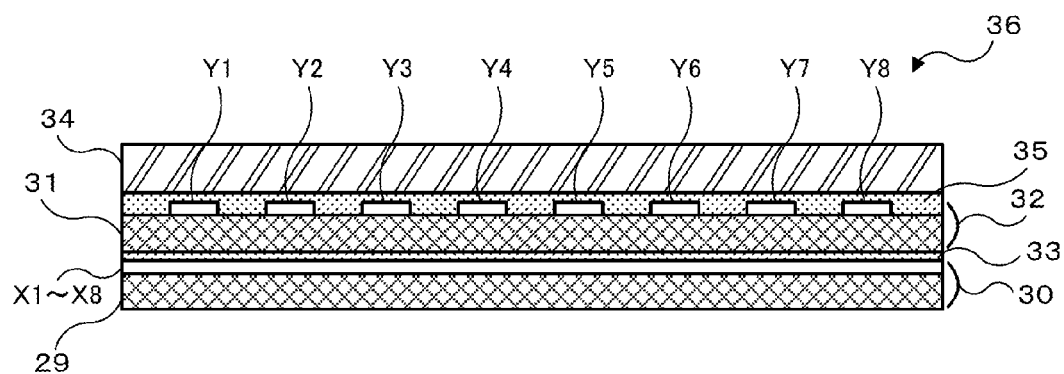
(b)
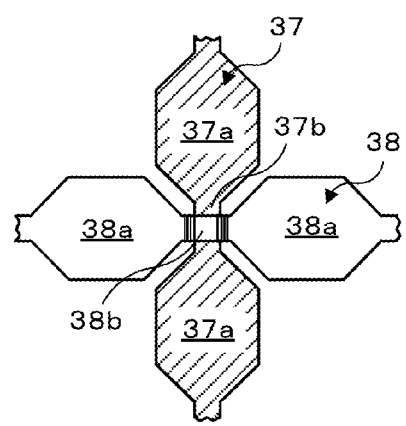
(c)
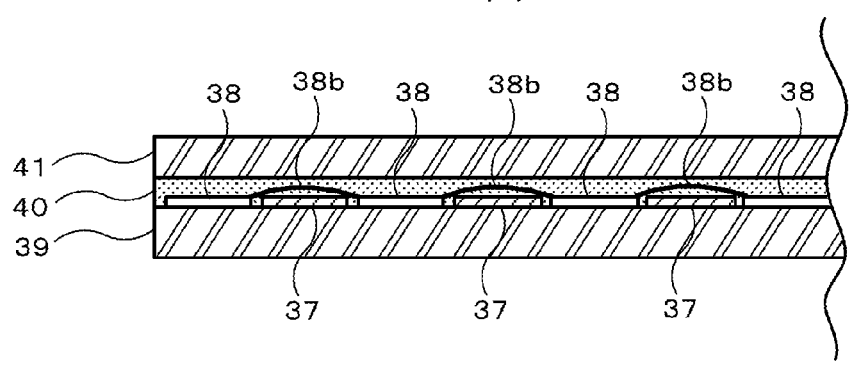

FIG. 13
(a)
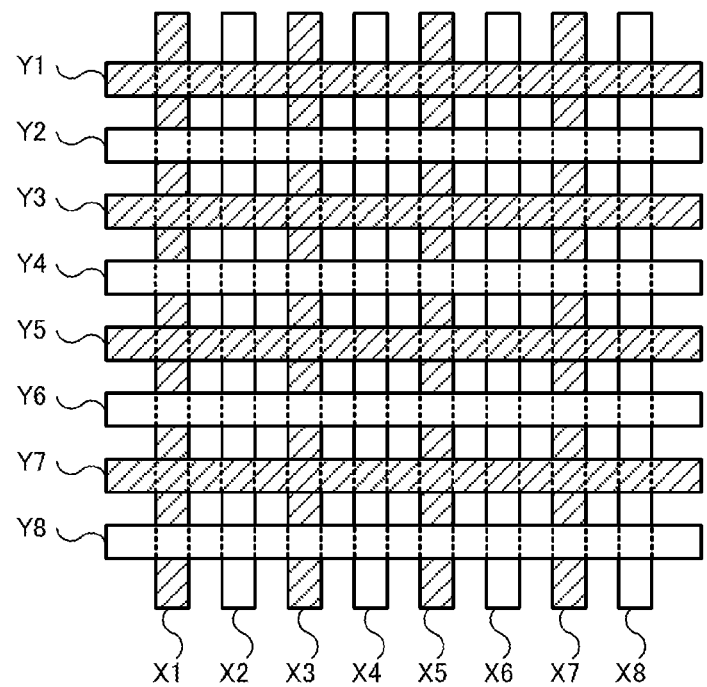
(b)
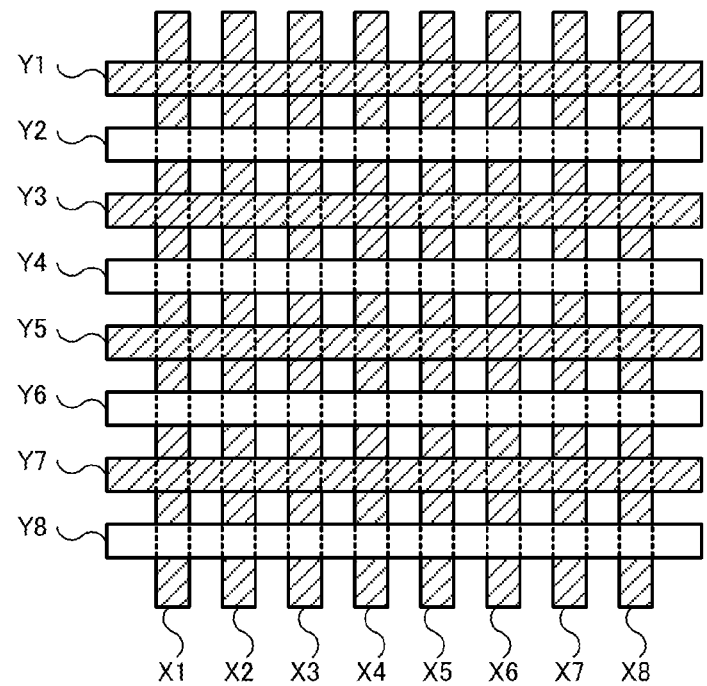

INPUT DEVICE, INPUT CONTROL METHOD, PROGRAM AND ELECTRONIC APPARATUS

CROSS REFERENCE TO RELATED APPLICATIONS

This is a national stage of International Application No. PCT/JP2011/006942 filed Dec. 13, 2011, claiming priority based on Japanese Patent Application No. 2010-293161 filed Dec. 28, 2010, the entire contents of which are incorporated herein by reference.

TECHNICAL FIELD

The present invention relates to an input device, input control method, program and electronic device and, in detail, to an input device called a touch panel, input control method, program and electronic device.

BACKGROUND ART

A touch panel refers to an input device for detecting a touch on a panel and providing a computer with a necessary command. There are various types such as a resistive film type, a capacitive type, a ultrasonic surface acoustic wave type, and an electromagnetic induction type, and the resistive film type and the capacitive type (to be accurate, a projected capacitive type) are in the main stream today, because there is not much difference in price between these types and these types can support multi-touch (detect a plurality of touch points).

In the resistive film type, a touch is detected with the same principle as that of a mechanical switch. That is, by using a force applied onto a panel, electrodes in the panel are turned ON. Therefore, a "pressing force" to some extent is required, although it is small. On the other hand, in the capacitive type, a touch is detected from a change in capacitance in the panel. This is because the human body can be regarded as a capacitor with a capacitance on the order of 100 pF and the capacitance is changed only with part of the human body (normally a fingertip; hereinafter typified by a fingertip) brought into contact with the panel. As such, while a necessary "pressing force" is required in the resistive film type, the capacitive type is different in that such a pressing force is not required. Therefore, since a touch panel of the capacitive type has an advantage of allowing a touch operation only with a fingertip brought into light contact with the panel, such a touch panel is expected to be developed in the future as being in the main stream as a touch panel for a portable phone, a portable information terminal, for example.

Meanwhile, the touch panel of the capacitive type can detect not only the touch operation described above (with a fingertip brought into light contact with the panel) but also a fingertip approaching operation (a so-called hover operation), because the capacitance of the panel is changed only with a fingertip brought near the panel. A hover operation can be detected by, for example, changing the sensitivity of the touch panel, but an erroneous detection may not be prevented only by simply enhancing the sensitivity. Moreover, there is an inconvenience of not being capable of differentiating between a touch operation and a hover operation.

<Patent Document 1 (Hereinafter, a First Conventional Technology>

This first conventional technology discloses a technology of differentiating between a touch operation and a hover operation according to the magnitude of a change in capacitance. However, this technology does not have an adjusting function for differentiating between a touch detection and a hover detection. Therefore, it is impossible to accurately and sufficiently differentiate among respective detections.

<Patent Document 2 (Hereinafter, a Second Conventional Technology>

This second conventional technology discloses a technology of differentiating between a touch operation and a hover operation based on a difference in signal pattern on a panel surface, specifically, a difference in pattern such that the surface of the fingertip in a non-contact state assumes a naturally rounded shape and therefore its signal pattern has a small area while the surface of the fingertip in a contact state is slightly crushed and a flat surface is spread and therefore its signal pattern is a bit large. However, while this technology can be said as having an adjusting function for differentiating between a touch detection and a hover detection (a method of examining the center of mass or others), its adjustment include estimation and the accuracy of differentiating between touch detection and hover detection is not sufficient.

<Patent Document 3 (Hereinafter, a Third Conventional Technology>

This third conventional technology describes a technology of changing detection resolution and detection sensitivity in a stepwise manner as an object (a fingertip) and the panel surface come closer to each other and sequentially scanning and detecting a distant hover operation, a near hover operation, and a touch operation for each step. That is, as depicted in FIG. 3 of this document, a minimum detection resolution and a maximum degree of detection sensitivity are applied to scan and detect a distant hover operation in a detection space I with distances Lp to Lq (where Lp>Lq) from the panel surface; an intermediate detection resolution and an intermediate degree of detection sensitivity are applied to scan and detect a near hover operation in a detection space II with next distances 0 to Lq; and a maximum detection resolution and a minimum degree of detection sensitivity are applied to scan and detect a touch operation at a final distance 0 (that is on the panel surface).

PRIOR ART DOCUMENTS

Patent Documents

Patent Document 1: JP 2003-330618
Patent Document 2: JP 2009-543246
Patent Document 3: JP 2008-117371

SUMMARY OF INVENTION

Problem to be Solved by the Invention

However, since the first conventional technology does not have an adjusting function for differentiating between touch detection and hover detection itself, not to mention accuracy, it is impossible to differentiate between touch detection and hover detection.

In the second conventional technology, since the adjusting function for differentiating between touch detection and hover detection includes estimation, the accuracy of differentiating between touch detection and hover detection is not sufficient.

Moreover, while detection and scanning are performed on a time-series basis as an adjusting function for differentiating between touch detection and hover detection in the third conventional technology, scanning is required for at least a plurality of number of times, and a time necessary for scanning is required compared with single-time scanning. Thus, accuracy is not sufficient.

Therefore, any of the first to third conventional technologies has a problem of insufficient accuracy.

Thus, an object of the present invention is to provide an input device, input control method, program, and electronic device capable of detecting not only a state in contact with a touch panel surface but also a state near the touch panel surface (a state before touching the touch panel surface with sufficient accuracy).

Means for Solving the Problem

An input device of the present invention is characterized to include selecting section for selecting a pair from among a plurality of X electrodes and Y electrodes disposed as being spaced apart from each other, detecting section for detecting a touch operation or a hover operation from a change of an electric characteristic of the pair, and setting section for setting part of at least either of the X electrodes and the Y electrodes as hover electrodes for hover operation detection and setting at least part of the other electrodes as touch electrodes for touch operation detection.

Effect of the Invention

According to the present invention, since an adjusting function for differentiating between touch detection and hover detection can be provided so as to be spatially divided for touch detection and hover detection, each detection mechanism can be appropriately placed, and touch detection and hover detection can be concurrently made. Therefore, detection of not only a state in contact with a touch panel surface but also a state near the touch panel surface can be made with sufficient accuracy, and an improvement in detection accuracy can be achieved.

BRIEF DESCRIPTION OF DRAWINGS

FIG. 5 shows diagrams for describing the principle of response determination as to whether the operation is a touch or hover operation.

FIG. 12 shows diagrams of other structures of the touch panel.

FIG. 13 shows diagrams of other modes of allocation of hover electrodes.

DESCRIPTION OF EMBODIMENTS

Embodiments of the present invention are described below with reference to the drawings.

Figure 1:
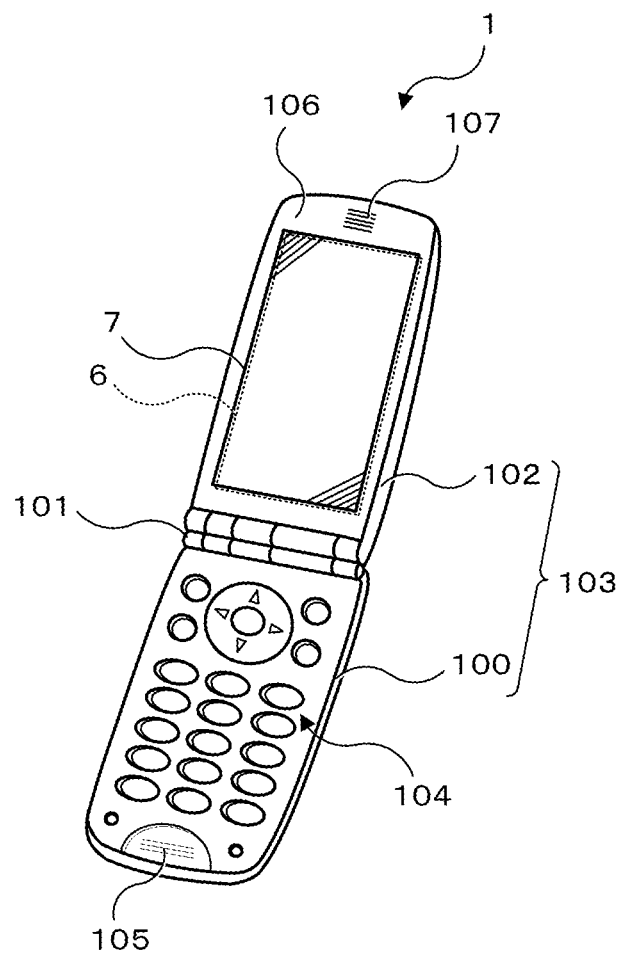
FIG. 1 is an external view of an electronic device with a touch panel of a projected capacitive type mounted thereon.

FIG. 1 is an external view of an electronic device with a touch panel of a projected capacitive type mounted thereon. In the drawing, the electronic device is a portable phone 1 by way of example, and this portable phone 1 has a so-called "fold-type" casing 103 including a main body unit 100 of a longitudinally-elongated box shape with a thickness and dimensions suitable for hand-held use and a thin lid unit 102 coupled via a hinge mechanism 101 to one upper short side end of the main body unit 100 and having a shape substantially identical to that of the main body unit 100.

The main body unit 100 has a surface (a surface facing the lid unit 102) provided with an operation button group 104 formed of many operation buttons and a mouthpiece 105. Also, the lid unit 102 has a surface (a surface facing the main body unit 100) provided with a display unit 6 having a front surface to which a touch panel 7 is affixed, a frame unit 106 covering the perimeter of this display unit 6, and an earpiece 107.

Note that while the portable phone 1 depicted in the drawing is of a "fold type", this is not meant to be restrictive. The portable phone may be of a non-fold type or a slide type. In short, any portable phone is possible as long as it has the touch panel 7 of the projected capacitive type mounted thereon. Furthermore, the type of device is not restricted to the portable phone. Any electronic device is possible as long as it has the touch panel 7 of the projected capacitive type mounted thereon and, for example, any is possible, such as a personal computer, a portable information terminal, a portable game machine, an electronic dictionary, or an electronic book display terminal. Still further, these electronic devices may or may not have portability (irrespective of a difference between a portable type and a mount type).

Figure 2:
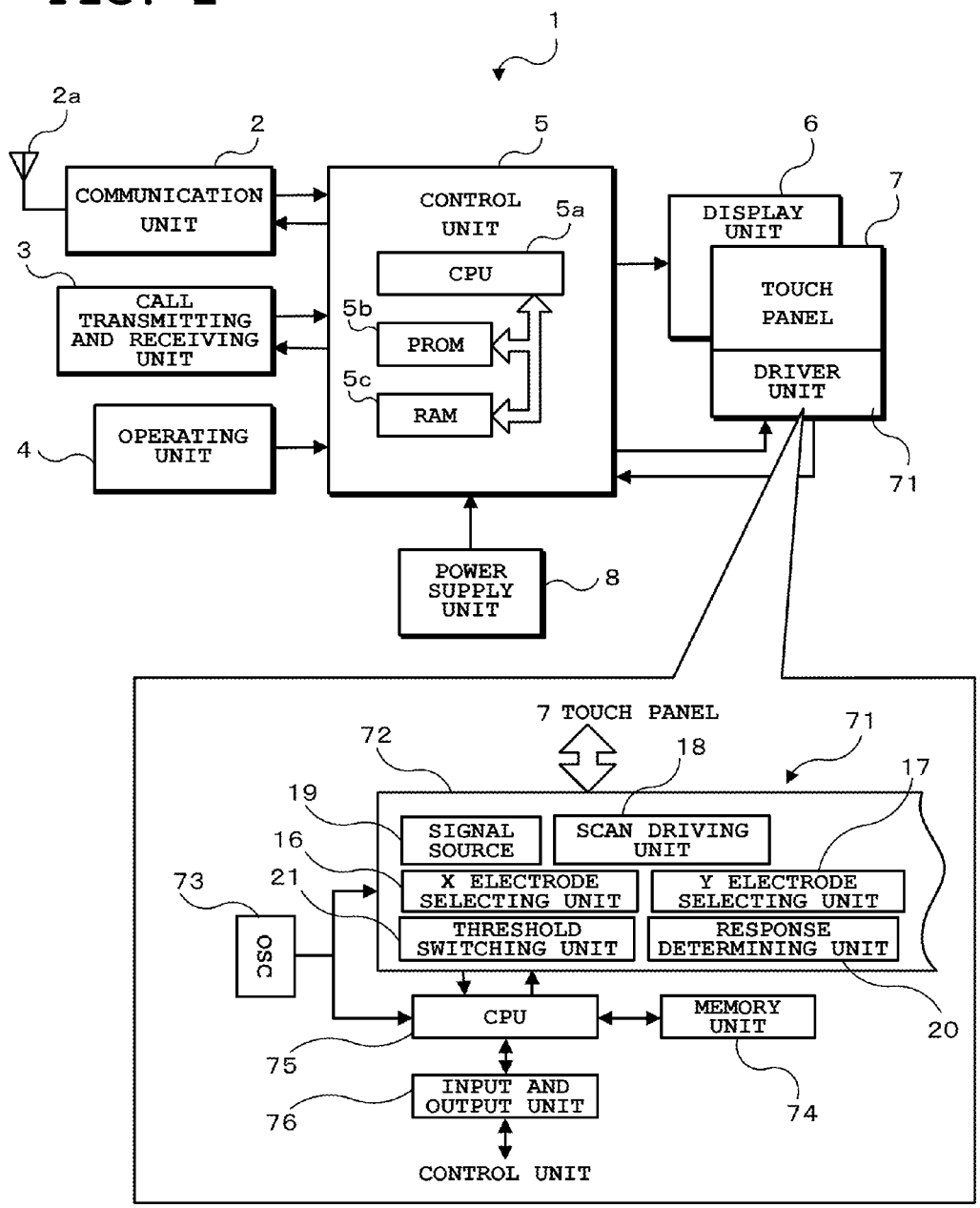
FIG. 2 is a diagram of the structure of a portable phone 1.

FIG. 2 is a diagram of the structure of the portable phone 1. This portable phone 1 includes a communication unit 2, a call transmitting and receiving unit 3, an operating unit 4, a control unit 5, the display unit 6, the touch panel 7, a power supply unit 8, a driver unit 71 of the touch panel 7, and others. Note that the driver unit 71 of the touch panel 7 depicted in the drawing is of a separate type externally mounted on the touch panel 7, this is not meant to be restrictive. The driver unit 71 may be of an integrated type incorporated inside the touch panel 7.

The communication unit 2 wirelessly transmits and receives analog or digital data to and from the nearest base station (omitted in the drawing) via an antenna 2a, and this data contains information about incoming calls and outgoing calls and information about voice calls and, if necessary, contents information when, for example, contents on the Internet are used (downloaded), and information about transmission and reception of electronic mails.

The call transmitting and receiving unit 3 includes a microphone and a loudspeaker not depicted in the drawing and, under the control from the control unit 5, this call transmitting and receiving unit 3 converts a voice signal from the microphone into digital data for output to the control unit 105 and converts a digital voice signal outputted from the control unit 5 into an analog signal for output from the loudspeaker.

The operating unit 4 includes various operation buttons (such as a power supply switch, ten keys, and a function key: refer to the operation button group 104 of FIG. 1) for necessary user input to the control unit 5, and the power supply unit 8 includes a battery (a primary battery or a chargeable secondary battery) for supplying power necessary for this portable phone 1.

The display unit 6 is a flat display device such as a liquid-crystal display. To a display surface of this display unit 6, the touch panel 7 of the projected capacitive type is affixed. While the display unit 6 and the touch panel 7 are drawn in the drawing so as to be slightly shifted in a surface direction, this is for convenience of description. In practice, the touch panel 7 of a planar size approximately equal to that of the display surface is placed so as to cover the entire display surface of the display unit 6. Also, the display unit 6 and the touch panel 7 are not necessarily separate components. For example, an integrated type is possible in which the touch panel 7 is incorporated on an upper layer side of a display layer (such as a liquid-crystal layer) of the display unit 6. The detailed structure of the touch panel 7 and its operation will be described further below.

The control unit 5 is a control element of a program control type including a microcomputer or simply a computer (hereinafter, a CPU) 5*a*, a rewritable non-volatile semiconductor memory (hereinafter, a PROM) 5*b*, a high-speed semiconductor memory (hereinafter, a RAM) 5*c*, and peripheral circuits not depicted in the drawing. For controlling the entire operation of the portable phone 1 in a centralized manner, this control unit 5 loads control programs stored in advance in the PROM 5*b* to the RAM 5*c*, and the CPU 5*a* executes the programs.

The control programs include a basic program called a so-called operating system (OS) supporting a graphical user interface and also a necessary driver program, in detail, a dedicated program necessary for the operation of specific hardware, for example, a driver program for the touch panel 7 and further include, together with these basic program and the driver program, a dedicated application program (application program) for achieving a specific function (in the example depicted in the drawing, a portable phone function).

The driver unit 71 of the touch panel 7 includes an analog circuit unit 72, a reference signal generating unit (OSC) 73 that generates an operation reference signal for the driver unit 71, and a microcomputer or simply a computer (CPU) 75 that controls the operation of each of units (such as a signal source 19, a scan driving unit 18, an X electrode selecting unit 16, a Y electrode selecting unit 17, a threshold switching unit 21, and a response determining unit 20) mounted on the analog circuit unit 72 while executing a predetermined control program (firmware) stored in advance in a memory unit 74 and exchanges data with the control unit 5 of the portable phone 1 via an input and output unit 76.

Figure 3:
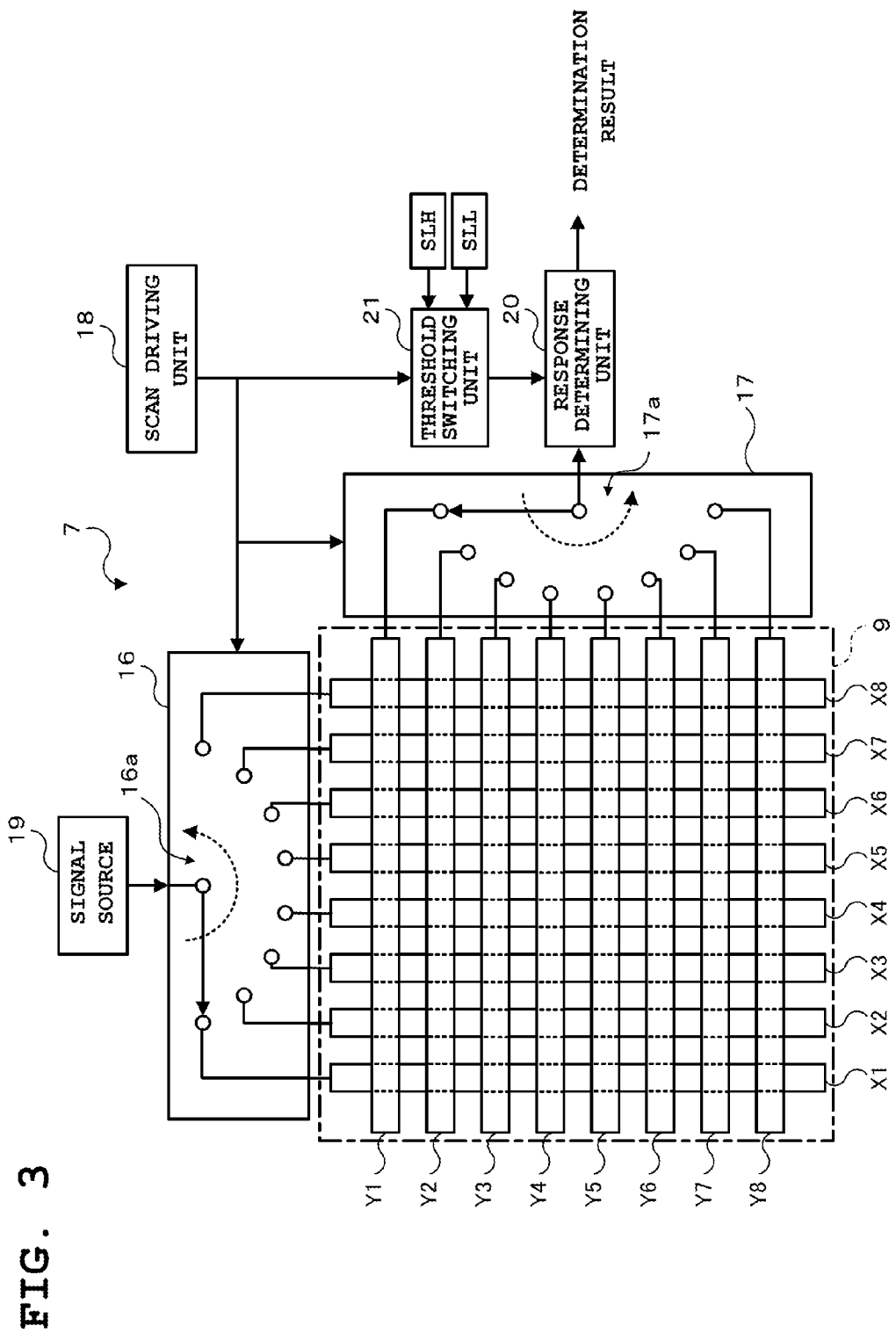
FIG. 3 is a conceptual diagram of the structure of a touch panel 7.

FIG. 3 is a conceptual diagram of the structure of the touch panel 7. In this drawing, the touch panel 7 includes a touch unit 9 having a planar size (lengthwise and breadthwise dimensions) approximately equal to that of the display surface of the display unit 6. The touch unit 9 has a structure of a so-called mutual capacitance type that includes a plurality of electrodes in lengthwise and breadthwise directions uniformly arranged with fine spacing. Note that while each electrode is a long electrode having a constant width in this drawing, this is not meant to be restrictive. For example, each electrode may be an electrode having a shape with squares, diamonds, or other shapes connected one after another.

Here, the lengthwise direction of the touch unit 9 (a vertical direction in the drawing) is set as a Y-axis direction, the breadthwise direction (a horizontal direction in the drawing) is set as an X-axis direction, the respective electrodes arranged in the lengthwise direction are provided with reference characters Y1 to Y8, and the respective electrodes arranged in the breadthwise direction are provided with reference characters X1 to X8.

Note that the number of electrodes (eight X and eight Y, respectively) depicted in the drawings is merely by way of example for description. Depending on the planar size of the touch unit 9, the number amounts to several hundred to several thousands in practice. Also, the touch unit 9 including the electrodes Y1 to Y8 and X1 to X8 is made of a translucent material, allowing any display information displayed on the display surface of the display unit 6 positioned on a rear surface side of the touch unit 9 to be viewable through this touch unit 9.

Figure 4:
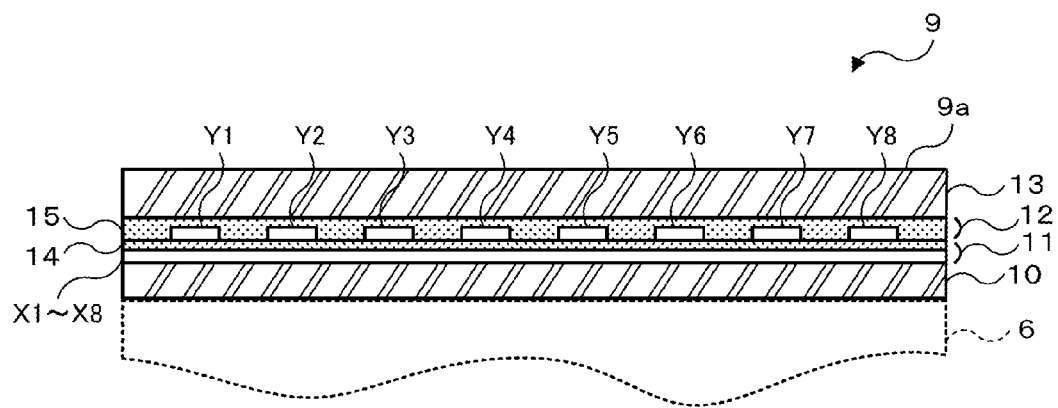
FIG. 4 is a sectional view of a touch unit 9.

FIG. 4 is a sectional view of the touch unit 9. In this drawing, the touch unit 9 includes a base transparent plate 10 such as a glass or a transparent film placed in contact with the display surface of the display unit 6, an X electrode layer 11 and a Y electrode layer 12 sequentially placed and laminated on the base transparent plate 10, and a protective transparent plate 13 such as a glass (preferably a toughened glass) or acrylic placed on an upper surface of the Y electrode layer 12. Note that when a glass or a toughened glass is used as the protective transparent plate 13, for readiness in case of a disruptive accident, a protective film for preventing scattering of glass fragments (for example, a protective transparent film) is desirably affixed to the glass surface.

The X electrode layer 11 has many electrodes X1 to X8 formed on a transparent dielectric film (for example, PET) 14 with fine spacing. Similarly, the Y electrode layer 12 has many electrodes Y1 to Y8 formed on a transparent dielectric film 15 with fine spacing. The electrodes X1 to X8 and Y1 to Y8 are formed by vapor-deposition, coating, or printing of a transparent conductive material, for example, ITO (Indium Tin Oxide).

Two electrode layers (the X electrode layer 11 and the Y electrode layer 12) have the same structure, except for an electrode arranging direction. However, they are different in that, as depicted in the drawing, the X electrode layer 11 and the Y electrode layer 12 are sequentially placed and laminated on the base transparent plate 10 and, in the example depicted in the drawing, the Y electrode layer 12 is positioned on the X electrode 11, and therefore the Y electrode layer 12 is an upper layer, that is, at a position near the surface of the touch unit 9 (a touch surface 9*a*). Note that this vertical relation may be reversed. That is, the X electrode layer 11 may be at an upper layer position. Here, however, description continues with the vertical relation assumed as depicted in the drawing (the Y electrode layer 12 is above the X electrode layer 11).

Referring back to FIG. 3 again, the X electrode selecting unit 16 is connected to one end side of the electrodes X1 to X8 and, similarly, the Y electrode selecting unit 17 is connected to one end side of the electrodes Y1 to Y8. These X electrode selecting unit 16 and Y electrode selecting unit 17 select one of the electrodes X1 to X8 and one of the electrodes Y1 to Y8, respectively in a line-sequential manner in response to a scanning signal from the scan driving unit 18. The line-sequential method may be performed for each row (Y) or each column (X). For example, each column (X) may be selected for each row (Y), or each row (Y) may be selected for each column (X). Here, the latter method is assumed to be adopted. That is, while selecting the X electrode on the first column (X1) in response to a scanning signal from the scan driving unit 18, the X electrode selecting unit 16 and the Y electrode selecting unit 17 sequentially select the Y electrodes from the first row to the eighth row (Y1 to Y8) during the selection, then, while selecting the X electrode on the second column (X2), they sequentially select the Y electrodes from the first row to the eighth row (Y1 to Y8) during the selection, . . . , and, finally, while selecting the X electrode on the eighth row (X8), they sequentially select the Y electrodes from the first row to the eighth row (Y1 to Y8) during the selection. By repeating this operation again and again, the electrodes X1 to X8 and the electrodes Y1 to Y8 are selected in a line-sequential manner. Note that while description has been made with a sequential selecting scheme, this is not meant to be restrictive. For example, a thinning-out selecting scheme may be adopted, such as skipping every other electrode or skipping every plural electrodes.

Eight-contact rotary switches 16a and 17a drawn in frames of the X electrode selecting unit 16 and the Y electrode selecting unit 17 are depicted so as to schematically depict a selecting operation of the X electrode selecting unit 16 and the Y electrode selecting unit 17, respectively. The X electrode selecting unit 16 supplies a drive signal (an alternating current signal with a predetermined frequency and at a predetermined signal level) from the signal source 19 to a selected electrode (any one of X1 to X8) via a contact of the rotary switch 16a. The Y electrode selecting unit 17 takes out a drive signal (one supplied from the signal source 19) passing through a capacitance between a selected electrode (any one of Y1 to Y8) and the X electrode selected by the X electrode selecting unit 16 at that moment via a contact of the rotary switch 17a, and then outputs the drive signal to the response determining unit 20.

The response determining unit 20 removes noise (such as a signal other than the drive signal generated at the signal source 19) from the drive signal taken out via the Y electrode selecting unit 17 for direct current electrification of the signal after removal of noise, and then compares this direct current signal with a predetermined determination threshold to determine whether a touch operation or a hover operation has been performed on the touch unit 9, and outputs the determination result to the control unit 5 as a predetermined event signal (a touch event or a hover event).

There are two thresholds in the present embodiment, one being a highly-sensitive detection threshold SLH for hover operation determination and the other being a lowly-sensitive detection threshold SLL for touch operation determination. In response to the scanning signal from the scan driving unit 18, the threshold switching unit 21 appropriately switches between these thresholds SLH and SLL for output to the response determining unit 20. The response determining unit 20 uses the threshold outputted from the threshold switching unit 21 to make a response determination as to whether the operation is a touch or hover operation.

The principle of response determination as to whether the operation is a touch or hover operation is described.

FIG. 5 shows diagrams for describing the principle of response determination as to whether the operation is a touch or hover operation. First, the case is described in which neither a touch or hover operation has been performed. In (a), a drive signal 22 generated at the signal source 19 is applied to one end of a capacitor C. The capacitor C represents a capacitance occurring between paired XY electrodes selected by the X electrode selecting unit 16 and the Y electrode selecting unit 17, and the drive signal 22 is an alternating current signal. Therefore, with part of the drive signal 22 passing through the capacitor C, by direct current electrification of the drive signal 22 passing through the capacitor C, that is, the drive signal 22 appearing at the other end of the capacitor C, a direct current voltage Ea with a value corresponding to the amount of passage through the capacitor C is obtained.

Next, if a touch operation has been performed, a capacitance Ca of the human body (Ca≈100 pF) acts on the capacitor C, as depicted in (b), thereby causing leakage of the drive signal 22 via this capacitance Ca. This is because the human body is regarded as a grounded body with the capacitance Ca. Due to this leakage, the drive signal 22 passing through the capacitor C is decreased and, in the end, a direct current voltage Eb of the drive signal 2 passing through the capacitor C is smaller than the direct current voltage Ea of (a) described above. Therefore, to differentiate between the presence and absence of a touch operation, it is sufficient to use appropriate thresholds capable of determining the direct current voltages Ea and Eb.

On the other hand, since a hover operation is a non-touch operation but in the state in which part of the human body such as a fingertip is near the touch surface 9a of the touch unit 9, the capacitance of the human body acts on the capacitor C also in this state. However, since the human capacitance in this state (a hover operation state) is smaller than the capacitance Ca at the time of touch operation, a threshold for hover operation determination is required to be allocated to a higher sensitivity side than the threshold for touch operation determination described above.

The thresholds of two types, SLH and SLL, in the present embodiment are decided in consideration of the above, and the highly-sensitive detection threshold SLH is for hover operation determination and the lowly-sensitive detection threshold SLL is for touch operation determination. Note that these words "highly-sensitive" and "lowly-sensitive" do not have particular meanings. As depicted in (c), it is sufficient to set a threshold slightly larger than a direct current voltage value E1 at the time of hover operation as SLH and set a threshold slightly larger than a direct current voltage value E2 at the time of touch operation as SLL, and these words merely mean that SLH is positioned on a high sensitivity side when viewed from SLL and, conversely, SLL is positioned on a low sensitivity side when viewed from SLH.

Figure 6:
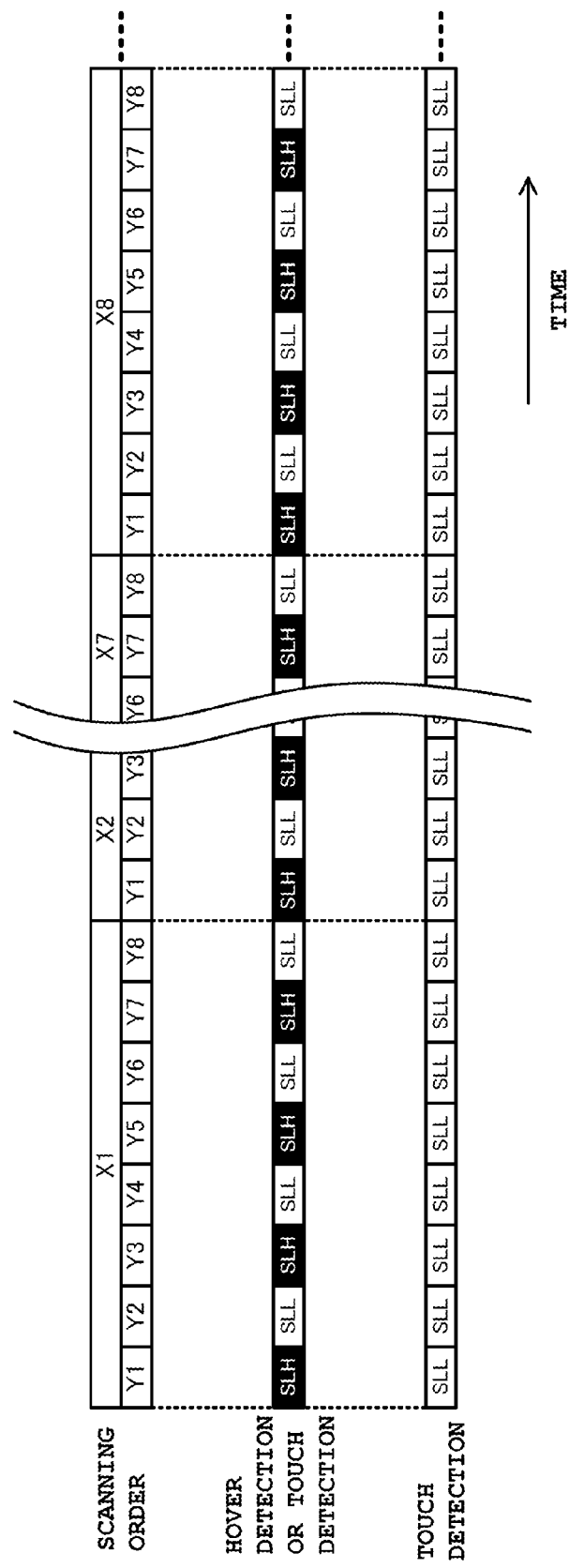
FIG. 6 is a timing diagram of an electrode scanning order and an application order of two thresholds.

FIG. 6 is a timing diagram of an electrode scanning order and an application order of two thresholds. In this drawing, the uppermost row represents a scanning order of the electrodes Y1 to Y8 and X1 to X8. This drawing depicts an example of line-sequential scanning in which each row (Y) is scanned for each column (X). That is, while the X electrode on the first column (X1) is selected, the Y electrodes from the first row to the eighth row (Y1 to Y8) are sequentially selected during the selection, then, while the X electrode on the second column (X2) is selected, the Y electrodes from the first row to the eighth row (Y1 to Y8) are sequentially selected during the selection, . . . (omitted) . . . then, while the X electrode on the seventh row (X7) is selected, the Y electrodes from the first row to the eighth row (Y1 to Y8) are sequentially selected during the selection and, finally, while the X electrode on the eighth row (X8) is selected, the Y electrodes from the first row to the eighth row (Y1 to Y8) are sequentially selected during the selection. By repeating this operation again and again, the example of line-sequential scanning shown in the drawing is performed.

There are two patterns of applying the thresholds firstly a pattern of alternately applying the highly-sensitive detection threshold SLH and the lowly-sensitive detection threshold SLL and secondly a pattern of applying only the lowly-sensitive detection threshold SLL. The intermediate row represents the first pattern, and the lowermost row represents the second pattern. In the first pattern, the highly-sensitive detection threshold SLH and the lowly-sensitive detection threshold SLL are alternately applied for each scanning of the electrodes Y1 to Y8. Here, the highly-sensitive detection threshold SLH is applied when odd-numbered Y electrodes (Y1, Y3, Y5, Y7) are scanned and the lowly-sensitive detection threshold SLL is applied when even-numbered Y electrodes (Y2, Y4, Y6, Y8) are scanned, but this may be reversed (the odd-numbered Y electrodes→the lowly-sensitive detection threshold SLL, the even-numbered Y electrodes→the highly-sensitive detection threshold SLH). In the second pattern, the lowly-sensitive detection threshold SLL is applied to all of the Y electrodes (Y1 to Y8).

Figure 7:
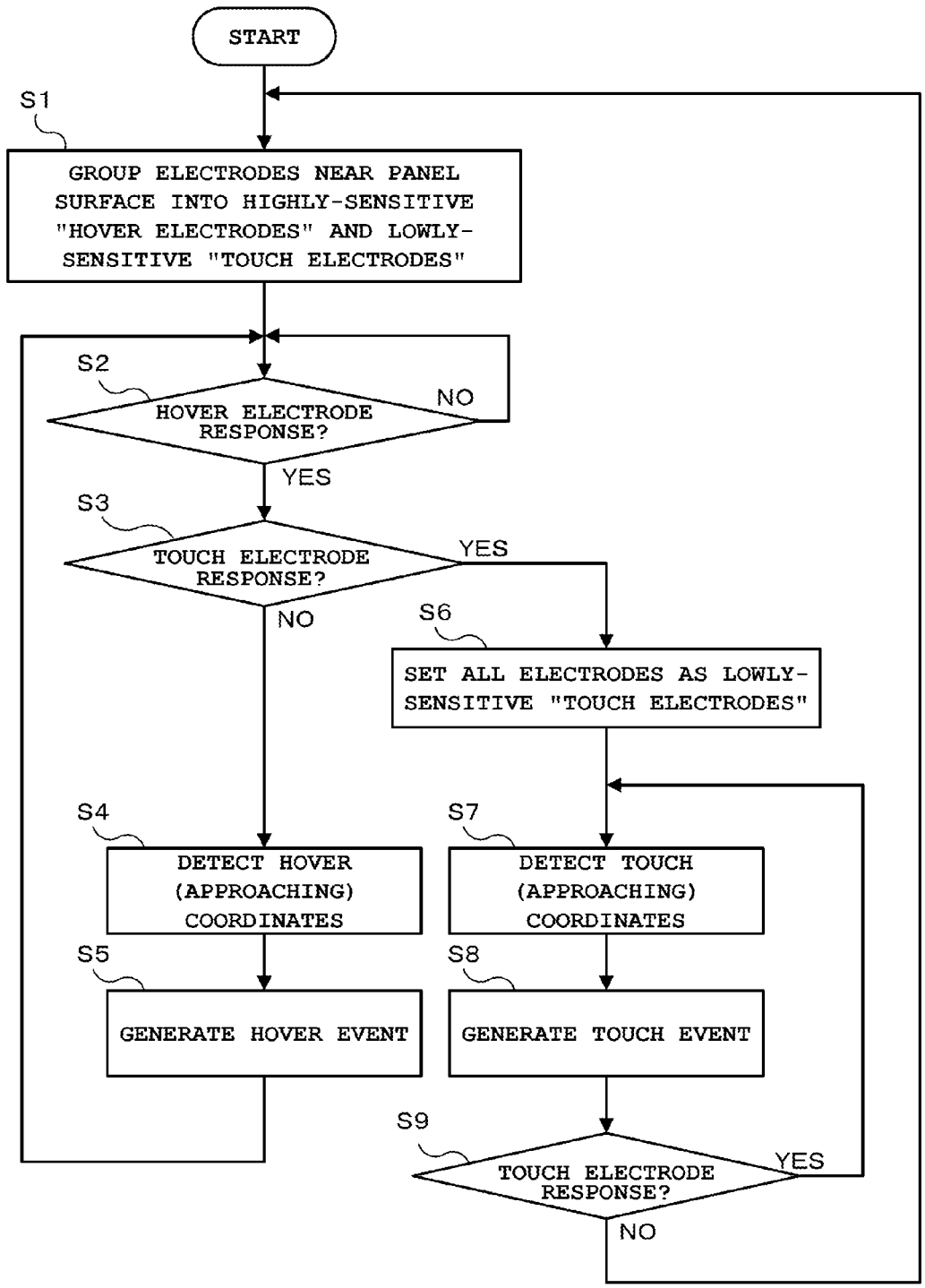
FIG. 7 is a diagram of a control operation flow of the touch panel 7.

FIG. 7 is a diagram of a control operation flow of the touch panel 7. Main parts of this operation flow are achieved in software by firmware executed at the CPU 75 of the driver unit 71 of the touch panel 7 and the control program executed at the CPU 5a of the control unit 5 (such as part of the basic program and the driver program of the touch panel 7). In this operation flow, electrodes near the panel surface (the touch surface 9a of the touch unit 9) (Y electrodes on an upper layer side in the example of structure of FIG. 4) are first grouped into highly-sensitive hover electrodes and lowly-sensitive touch electrodes (Step S1). This grouping is desirably performed so that the hover electrodes and the touch electrodes are distributed as uniformly as possible.

The first pattern described above (refer to FIG. 6) depicts a practical example of this grouping. Among others, since adjacent Y electrodes are allocated as a hover electrode and a touch electrode so that "the highly-sensitive detection threshold SLH and the lowly-sensitive detection threshold SLL are alternately applied for each scanning of the electrodes Y1 to Y8", this first pattern is the most preferable example in which the hover electrodes and the touch electrodes are uniformly distributed.

Figure 8:
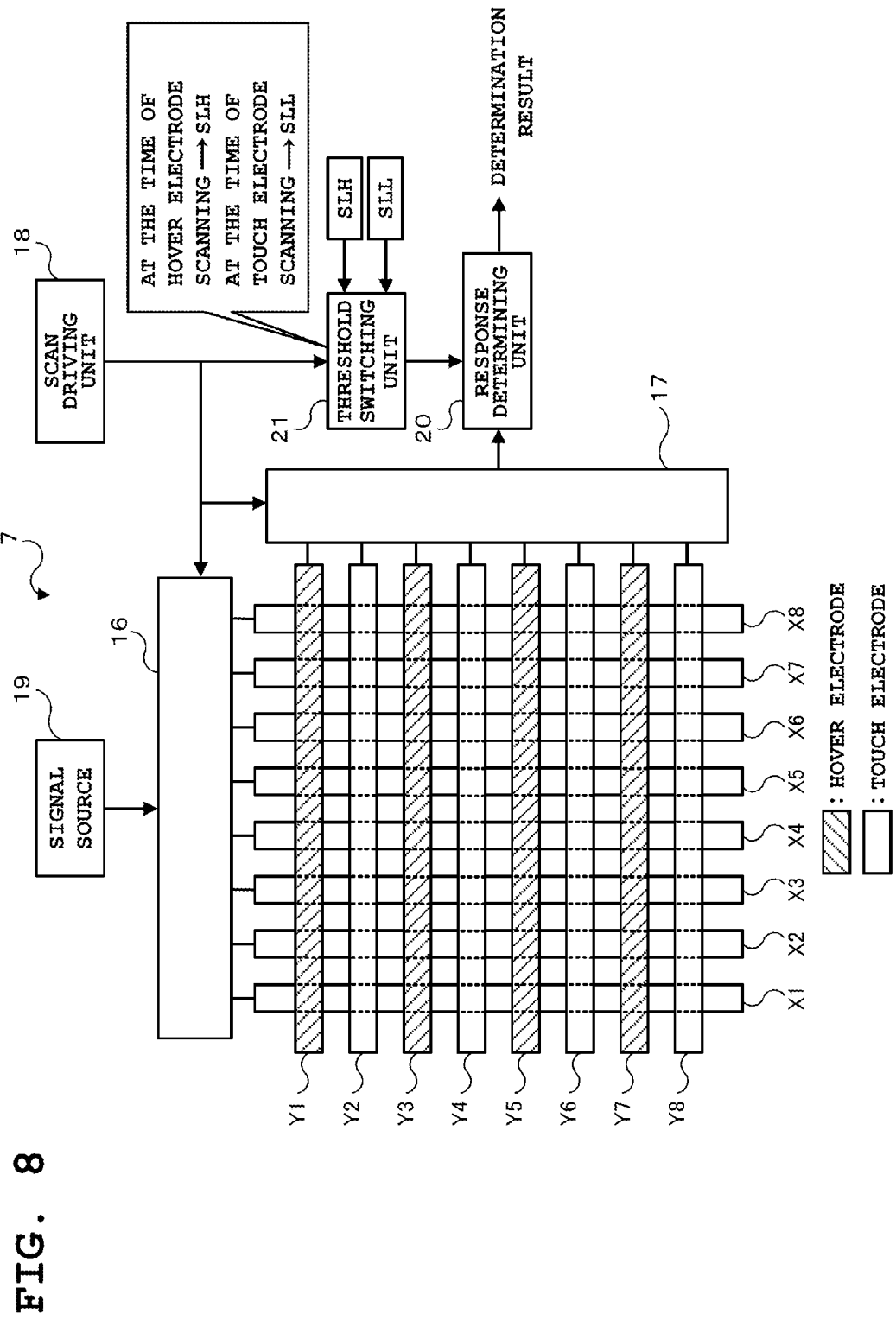
FIG. 8 is a diagram of pattern classification into hover electrodes and touch electrodes.

FIG. 8 is a diagram of pattern classification into hover electrodes and touch electrodes. In this drawing, the odd-numbered Y electrodes (Y1, Y3, Y5, Y7) among Y electrodes near the panel surface (the touch surface 9a of the touch unit 9) are set as hover electrodes, and the remaining even-numbered Y electrodes (Y2, Y4, Y6, Y8) are set as touch electrodes. That is, the example of pattern classification depicted in the drawing depicts a best mode in which the hover electrodes and the touch electrodes are most uniformly distributed (corresponding to the first pattern in FIG. 6), but this is not meant to be restrictive. Grouping into hover electrodes and touch electrodes may be performed for every n (n=2, 3, . . . ) Y electrodes.

Upon completion of grouping, a determination as to a "hover electrode response" is made (Step S2). The hover electrode response refers to the state in which a detection signal with a magnitude corresponding to the highly-sensitive detection threshold SLH (a direct current voltage after the drive signal taken out via the capacitance of the XY electrodes during the selection is direct current electrification) has been detected at the response determining unit 20.

If a hover electrode response is not determined, the determination process is looped. If a hover electrode response is determined, it is determined that part of the human body such as a fingertip is near the touch surface 9a of the touch unit 9, and subsequently a determination as to "touch electrode response" is made (Step S3).

The touch electrode response refers to the state in which a detection signal with a magnitude corresponding to the lowly-sensitive detection threshold SLL (a direct current voltage after the drive signal taken out via the capacitance of the XY electrodes during the selection is direct current electrification) has been detected at the response determining unit 20.

Here, if a touch electrode response is not determined, it is determined that a hover operation has been performed, and coordinates of XY electrodes at the time of detecting the detection signal with the magnitude corresponding to the highly-sensitive detection threshold SLH are detected as hover coordinates (Step S4), and also a predetermined event signal including this coordinate information (hereinafter, a hover event) is generated (Step S5). The procedure then returns to Step S2 again.

On the other hand, when a touch electrode response is determined at Step S3, it is determined that a touch operation was performed immediately after the hover operation. In this case, the lowly-sensitive detection threshold SLL is applied to all of the Y electrodes to set touch electrodes (Step S6), and then coordinates of XY electrodes at the time of detecting the detection signal with the magnitude corresponding to the lowly-sensitive detection threshold SLL are detected as touch coordinates (Step S7), and also a predetermined event signal including this coordinate information (hereinafter, a touch event) is generated (Step S8). Then a determination as to a touch electrode response is again made (Step S9). If a touch electrode response is present, the procedure repeats Step S7 to Step S9. On the other hand, if a touch electrode response is absent, the procedure returns to Step S1 again.

Figure 9:
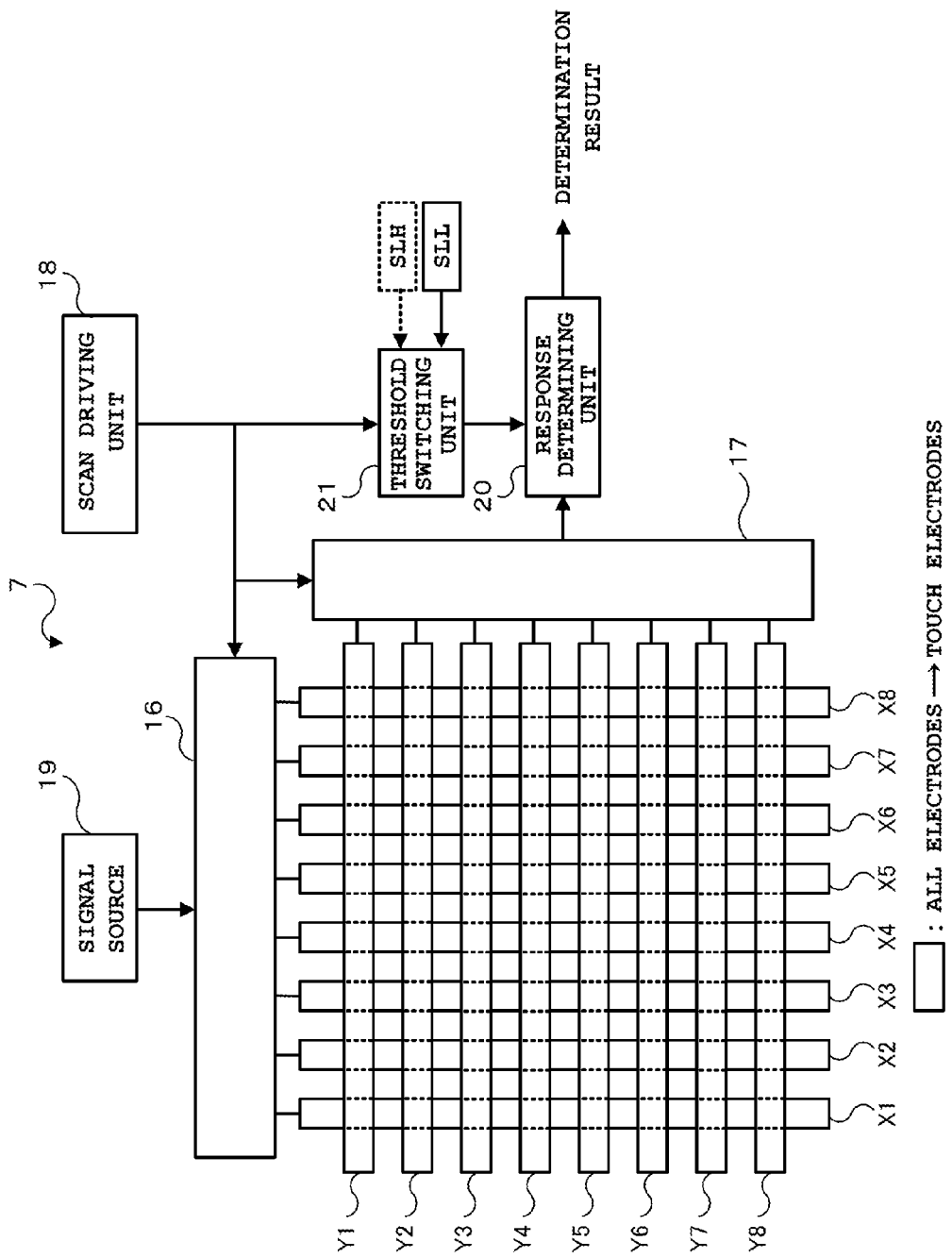
FIG. 9 is a diagram of threshold application when a touch operation is determined.

FIG. 9 is a diagram of threshold application when a touch operation is determined. As depicted in this drawing, if a touch electrode response is determined at Step S3, the lowly-sensitive detection threshold SLL is applied to all of the Y electrodes (Y1 to Y8). This measure is performed exclusively in order to enhance the resolution of detecting touch coordinates. That is, this measure is performed in order to enhance the resolution of detecting touch coordinates (also referred to as detection accuracy) by using all of the Y electrodes as touch detection electrodes to a degree of the space among Y1 to Y8, and is not a requisite matter for improving detection responsiveness to a touch operation or detecting and differentiating between a hover operation and a touch operation.

The hover event and the touch even are used as appropriate as an impetus for performing any process in the basic program and the application program to be executed at the CPU 5a of the control unit 5. For example, with the occurrence of a hover event as an impetus, the position of a cursor (a sign such as an under line or an arrow for indicating an input position displayed on a screen, and is also referred to as a caret or an insertion pointer) may be controlled. Alternatively, with the occurrence of a touch even as an impetus, a determining process corresponding to a return key operation on a keyboard or a click operation on a mouse may be performed.

While the touch panel 7 of the present embodiment performs the operations described above, main points of these operations are described. In the touch panel 7, the electrodes near the panel surface (Y1 to Y8) are grouped into hover electrodes with a high degree of sensitivity and touch electrodes with a low degree of sensitivity and, in the grouped state, determinations as to a hover operation and a touch operation are separately made. That is, when the determination result at Step S2 is YES and the determination result at Step S3 is NO, it is determined that "a hover operation is present". When the determination result at Step S2 is YES and the determination result at Step S3 is YES, it is determined that "a touch operation is present". For this reason, in the present embodiment, a first effect can be obtained in which a hover operation and a touch operation can be differentiated and detected, and a second effect can also be obtained in which a determination as to a touch operation immediately after a hover operation can be quickly made, thereby not inviting deterioration in responsiveness of a determination as to a touch operation.

This second effect is further described. For example, in the third conventional technology described in the beginning, while the adjusting function for differentiating between touch detection and hover detection is provided, detection scanning for differentiation is performed on a time-series basis, and therefore scanning is required for a plurality of times, thereby posing problems in which the time required for scanning is long compared with single-time scanning and sufficient accuracy cannot be obtained when the scanning time is short. In the present embodiment, even if a touch operation is performed immediately after a hover operation, YES determination at Step S2-YES determination at Step S3 is established, thereby allowing a touch operation to be immediately determined. Therefore, compared with scanning for a plurality of number of times in the third conventional technology, the detection result can be quickly obtained. In addition, in the present embodiment, since the adjusting function for differentiating between touch detection and hover detection can be provided so as to be spatially divided for touch detection and hover detection, with each detection mechanism appropriately place, touch detection and hover detection can be concurrently made. Therefore, detection of not only a state in contact with the touch panel surface but also a state near the touch panel surface can be made with sufficient accuracy, and an improvement in detection accuracy can be achieved.

Note that while a sensitivity change between a hover electrode and a touch electrode is performed by switching between thresholds (SLH, SLL), this is not meant to be restrictive. In short, the sensitivity of the hover electrode can be set relatively higher than the sensitivity of the touch electrode and, for example, the following may be applied.

Figure 10:
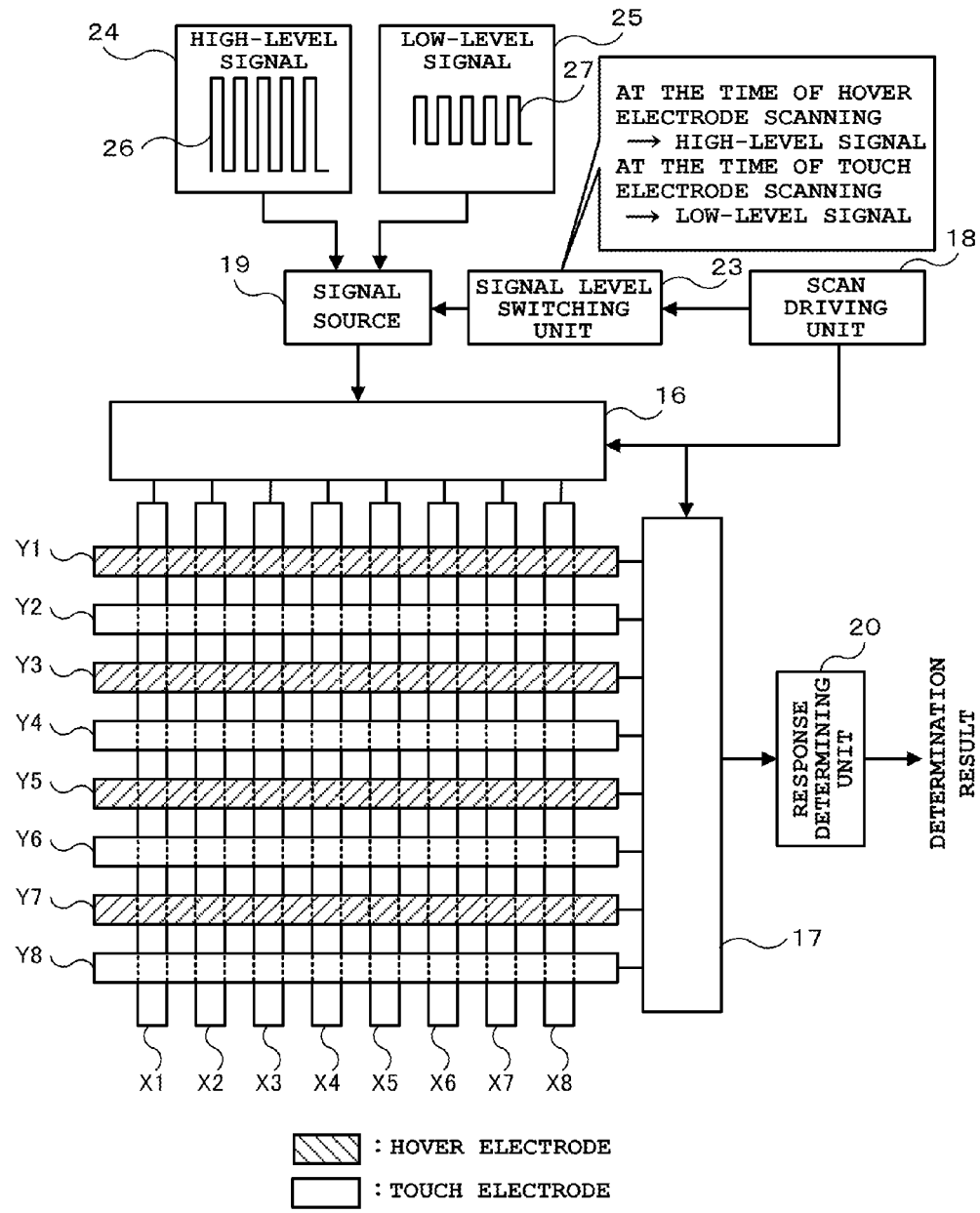
FIG. 10 is a diagram of another example of a sensitivity change.

FIG. 10 is a diagram of another example of a sensitivity change. A difference in this drawing from the previous embodiment (the structure of FIG. 3) is that a signal level switching unit 23 is provided in place of the threshold switching unit 21 for switching between the two thresholds (SLH, SLL). This signal level switching unit 23 is to switch the drive signal generated at the signal source 19 to one of a high-level signal 26 from a high-level signal generation source 24 and a low-level signal 27 from a low-level signal generation source 25, and switching timing is similar to that between two thresholds (SLH, SLL) described above. That is, timing is such that the high-level signal 26 is applied when the odd-numbered Y electrodes (Y1, Y3, Y5, Y7) are scanned as hover electrodes, and the low-level signal 27 is applied when the even-numbered Y electrodes (Y2, Y4, Y6, Y8) are scanned as touch electrodes.

As with the embodiment described above, the odd-numbered Y electrodes are hover electrodes and the even-numbered Y electrodes are touch electrodes, and these hover electrodes (the odd-numbered Y electrodes) are driven with the high-level signal 26 and these touch electrodes (the even-numbered Y electrodes) are driven with the low-level signal 27. Therefore, as with the threshold switching scheme described above, the sensitivity of the hover electrodes can be made relatively higher than the sensitivity of the touch electrodes. Therefore, even in this modification example, the first effect can be obtained in which a hover operation and a touch operation can be differentiated and detected and, furthermore, the second effect can also be obtained in which a determination as to a touch operation immediately after a hover operation can be quickly made, thereby not inviting deterioration in responsiveness of a determination as to a touch operation.

Note that while part of the electrodes (Y1, Y3, Y5, Y7) among the electrodes on the side near the touch surface 9a (Y electrodes) are set as "hover electrodes" for detecting a hover operation and the remaining electrodes (Y2, Y4, Y6, Y8) are set as "touch electrodes" for detecting a touch operation in the above description, the present invention is not restricted to this mode, and may be as follows.

Figure 11:
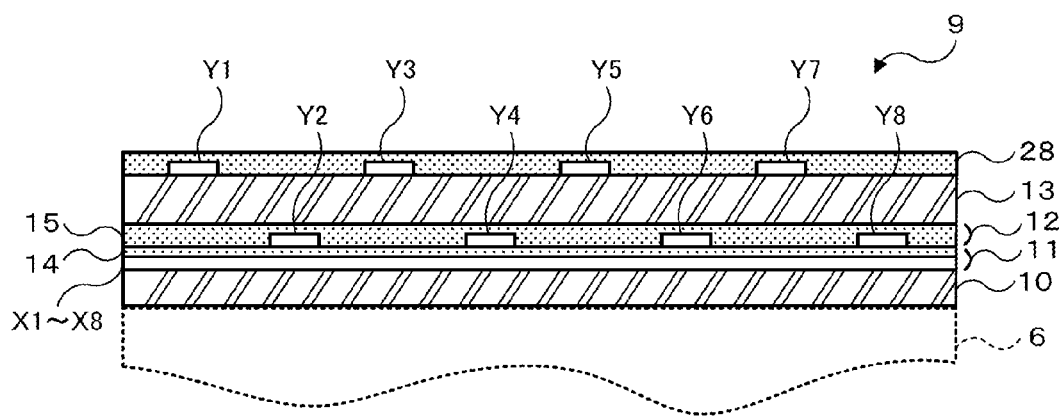
FIG. 11 is a diagram of another example of allocation of hover electrodes and touch electrodes.

FIG. 11 is a diagram of another example of allocation of hover electrodes and touch electrodes. This drawing corresponds to the sectional view of the touch unit 9 depicted in FIG. 4 described above. A difference from FIG. 4 is that part of the Y electrodes (Y1, Y3, Y5, Y7) formed on the Y electrode layer 12 are moved onto the protective transparent plate 13 and the moved Y electrodes (Y1, Y3, Y5, Y7) are protected with a film 28 (for example, a glass-scattering-preventive film).

With this, part of the Y electrodes (Y1, Y3, Y5, Y7) are brought closer to the touch surface (a surface of the film 28) than the other Y electrodes (Y2, Y4, Y6, Y8). Therefore, without requiring switching a threshold or a drive signal, part of the Y electrodes (Y1, Y3, Y5, Y7) can be used as hover electrodes with a high degree of sensitivity and the other electrodes (Y2, Y4, Y6, Y8) can be used as touch electrodes with a low degree of sensitivity.

However, in this case, the process at Step S6 in FIG. 7 (all electrodes are set as touch electrodes with a low degree of sensitivity) cannot be performed, because part of the Y electrodes (Y1, Y3, Y5, Y7) function as dedicated electrodes for detecting a hover operation.

Therefore, in the other example depicted in FIG. 11, when a touch detection is determined at Step S3 of FIG. 7, it is impossible to "set all electrodes as touch electrodes with a low degree of sensitivity", posing a disadvantage in which the resolution of detecting touch coordinates cannot be enhanced. However, it is possible to obtain at least an effect in which "a hover operation and a touch operation can be differentiated and detected without inviting degradation in detection responsiveness to the touch operation", and therefore the other example belongs to the same technical idea as that of the embodiment described above.

Also, the structure of the touch panel 7 is not restricted to the examples above. For example, the structure may be as follows.

FIG. 12 shows diagrams of other structures of the touch panel. As depicted in (a), an X electrode layer 30 having X electrodes (X1 to X8) equidistantly arranged and formed on a first dielectric layer 29 made of PET or the like and a Y electrode layer 32 having Y electrodes (Y1 to Y8) equidistantly arranged and formed on a second dielectric layer 31 similarly made of PET or the like are laminated with an adhesive 33. Furthermore, the touch panel 7 with a touch unit 36 having a structure in which the Y electrode layer 32 and a transparent cover body 34 such as a protective toughened glass are laminated with an adhesive 35 may be used.

Alternatively, a touch panel may have a structure in which the X electrodes and the Y electrodes are formed on the same layer. (b) is a plan view of this type, and X electrodes 37 and the Y electrodes 38 depicted as being partially representative include electrode units 37a and 38a alternately arranged on the same layer and connecting units 37b and 38b each connecting electrodes aligned in the same direction (an X direction, a Y direction), in which one connecting unit goes across the other connecting unit (in the drawing, the connecting unit 37b goes across the connecting unit 38b) (c) is a sectional view of this type, with a structure in which the X electrodes 37 and the Y electrodes 38 are formed and arranged on a transparent substrate 39 such as a glass and, on these electrodes, a transparent cover body 41 such as a protective toughened glass is laminated by using an adhesive 40.

Also, a main point of the present embodiment is that part of ones of the X electrodes and the Y electrodes are set as hover electrodes for detecting a hover operation and the remaining are set as touch electrodes for detecting a touch operation. It is sufficient to set hover electrodes for detecting a hover operation at "at least" part of either of the X electrodes and the Y electrodes. While part of the "Y electrodes", which are ones of the X electrodes and the Y electrodes, are set as hover electrode for detecting a hover operation in the embodiment described above, this merely describes one of enabled modes.

Part of the "X electrodes" may be set as hover electrodes for detecting a hover operation, or the following may be possible.

FIG. 13 shows diagrams of other modes of allocation of hover electrodes. (a) depicts an example in which part of the X electrodes (in this drawing, X1, X3, X5, X7) and part of the Y electrodes (in this drawing, Y1, Y3, Y5, Y7) are allocated as hover electrodes for detecting a hover operation, (b) depicts an example in which all of the X electrodes (X1 to X8) and part of the Y electrodes (in this drawing, Y1, Y3, Y5, Y7) are allocated as hover electrodes for detecting a hover operation.

In comparison between these two mode examples depicted in (a), (b), there is a difference in resolution of detecting a hover operation. That is, while part of the X electrodes and part of the Y electrodes are set as hover electrodes in (a), all of the X electrodes and part of the Y electrodes are set as hover electrodes in (b). Thus, the degree of density of hover electrodes becomes "(a)<(b)", and therefore an advantage can be obtained in which the detection resolution in (b) is high.

The degree of density of hover electrodes is low in (a) and therefore there is a disadvantage of low detection resolution on one hand. On the other hand, a low degree of density means a small number of electrodes to be driven as hover electrodes, and thus "the number of electrodes to be driven→small→drive power→small" is established. In the end, an advantage of power saving can be suggested. This advantage (power saving) also applies in the embodiment described above, because part of either of the X electrodes and the Y electrodes are set as hover electrodes in the embodiment and the degree of density of hover electrodes are similar to or lower than that depicted in (a). To adopt which mode from among the mode of the embodiment and the modes of FIGS. 13 (a), (b), it is sufficient to select a mode as appropriate depending on which of power saving or resolution is to be valued.

DESCRIPTION OF REFERENCE NUMERALS

SLH highly-sensitive detection threshold (threshold)
SLL lowly-sensitive detection threshold (threshold)
X1~X8 X electrodes
Y1~Y8 Y electrodes
7 touch panel (input device)
9a touch surface (operation surface)
16 X electrode selecting unit (selecting means)
17 Y electrode selecting unit (selecting means)
20 response determining unit (detecting means)
21 threshold switching unit (setting means)
22 drive signal
23 signal level switching unit (setting means)
26 high-level signal (drive signal)
27 low-level signal (drive signal)
75 CPU (computer)

The invention claimed is:
1. An input device comprising:
a selecting section for selecting a pair from among a plurality of X electrodes and Y electrodes disposed as being spaced apart from each other;
a detecting section for detecting a touch operation or a hover operation from a change of an electric characteristic of the pair;
a setting section for setting one or more electrodes selected from among at least either of the X electrodes and the Y electrodes as hover electrodes for hover operation detection and setting electrodes other than the one or more electrodes as touch electrodes for touch operation detection; and
a switching section for switching detection sensitivity of the detecting section,
wherein the switching section sets the detection sensitivity of the detecting section at a high degree of sensitivity when part of electrodes of either of the X electrodes or the Y electrodes are selected by the selecting section, and sets the detection sensitivity of the detecting section at a low degree of sensitivity when electrodes remaining in said either of the X electrodes or the Y electrodes are selected.

2. The input device according to claim 1, wherein the setting section resets the hover electrodes as touch electrodes for touch operation detection when a touch operation is detected by the touch electrodes.

3. The input device according to claim 1, wherein either of the X electrodes and the Y electrodes are electrodes positioned near an operation surface of the touch operation or the touch operation.

4. The input device according to claim 1, wherein the electric characteristic of the pair is a capacitance,
the detecting section detects a change of the capacitance by comparing a signal value indicating the change of the capacitance and a threshold, and
the switching section switches the detection sensitivity of the detecting section by changing the threshold of the detecting section.

5. The input device according to claim 1, wherein the electric characteristic of the pair is a capacitance,
the detecting section detects a change of the capacitance by comparing a magnitude of a drive signal applied to one end of the capacitance and appearing at another end of the capacitance or a signal value indicating the magnitude and a threshold, and
the switching section switches the detection sensitivity of the detecting section by changing the magnitude of the drive signal applied to the one end of the capacitance or the signal value indicating the magnitude.

6. An electronic device comprising the input device according to claim 1.

7. An input control method comprising:
a selecting step of selecting a pair from among a plurality of X electrodes and Y electrodes disposed as being spaced apart from each other;
a detecting step of detecting a touch operation or a hover operation from a change of an electric characteristic of the pair;
a setting step of setting one or more electrodes selected from among at least either of the X electrodes and the Y electrodes as hover electrodes for hover operation detection and setting electrodes other than the one or more electrodes as touch electrodes for touch operation detection; and
a switching step of switching detection sensitivity of the detecting step,
wherein the switching step sets the detection sensitivity of the detecting step at a high degree of sensitivity when part of electrodes of either of the X electrodes or the Y electrodes are selected by the selecting step, and sets the detection sensitivity of the detecting step at a low degree of sensitivity when electrodes remaining in said either of the X electrodes or the Y electrodes are selected.

8. A non-transitory computer-readable storage medium having stored thereon a program that is executable by a computer of an input device to perform functions comprising:
a selecting section for selecting a pair from among a plurality of X electrodes and Y electrodes disposed as being spaced apart from each other;

a detecting section for detecting a touch operation or a hover operation from a change of an electric characteristic of the pair;

a setting section for setting one or more electrodes selected from among at least either of the X electrodes and the Y electrodes as hover electrodes for hover operation detection and setting electrodes other than the one or more electrodes as touch electrodes for touch operation detection; and a switching section for switching detection sensitivity of the detecting section, wherein the switching section sets the detection sensitivity of the detecting section at a high degree of sensitivity when part of electrodes of either of the X electrodes or the Y electrodes are selected by the selecting section, and sets the detection sensitivity of the detecting section at a low degree of sensitivity when electrodes remaining in said either of the X electrodes or the Y electrodes are selected.

* * * * *